Figure 2:
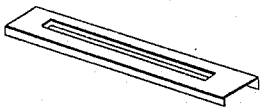
Figure 3:
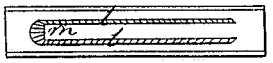
Figure 4:
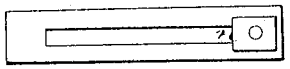
Figure 1:
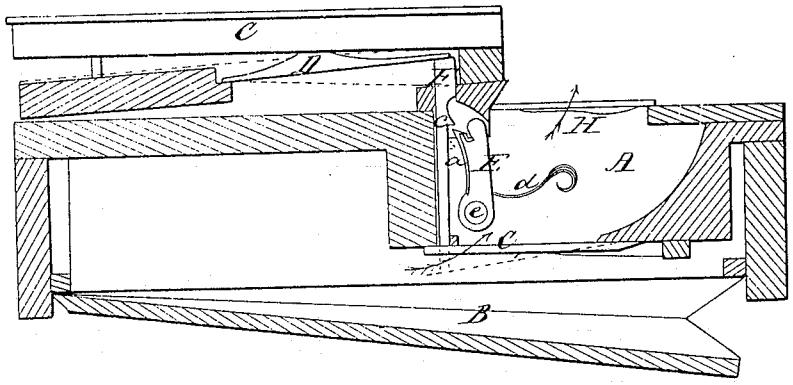

F. A. Gleason,

Reed Organ.

No. 117.

A.I. Patented Nov. 14, 1854

N. PETERS, PHOTO-LITHOGRAPHER, WASHINGTON, D. C.

MISSING PAGE TEMPORARY NOTICE

PATENT # AI 117 FOR ISSUE DATE 11-14-1854

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

ALL OF TEXT.